UNITED STATES PATENT OFFICE.

CARLETON ELLIS, OF MONTCLAIR, NEW JERSEY.

CATALYZER AND PROCESS OF MAKING CATALYTIC MATERIAL.

1,084,258. Specification of Letters Patent. Patented Jan. 13, 1914.

No Drawing. Application filed August 6, 1913. Serial No. 783,371.

*To all whom it may concern:*

Be it known that I, CARLETON ELLIS, a citizen of the United States, and a resident of Montclair, in the county of Essex and State of New Jersey, have invented certain new and useful Improvements in Catalyzers and Processes of Making Catalytic Material, of which the following is a specification.

This invention relates to material especially adapted for catalytically transferring under suitable conditions hydrogen or other additive element or body and to the process of making a catalyst and relates in part to catalytic material comprising a metal-containing or metalliferous hydrogen carrier such as nickel, platinum and palladium, in free or combined state, incorporated with but preferably substantially not impregnating an extending body of a porous or preferably non-porous nature including (a) active extenders and specific activators such as certain charcoals, gas black and graphitic substances and similar activating and intensifying material, or if desired including (b) inert or inactive material such as kieselguhr, fullers' earth, pumice and the like.

This application is based on matter disclosed in or derived from my copending application Serial No. 679,771 filed Feb. 24, 1912.

Considering first a catalyzer composite embracing an activator or intensifying agent such as certain charcoals, lampblack, gas black and the like it may be stated that ordinary lamp black as a rule is not suitable and usually or preferably should be purified to remove oils and sulfur. If a metallic oxid is to be used with the lamp black and is to be precipitated from aqueous solution thereon or therein much difficulty is experienced because of the water-repelling action of the black. If the presence of oily or greasy material in the lamp black is not objectionable, the latter may be treated as follows: The black is mixed with a solution of an alkali as for example sodium hydrate or carbonate, the alkali preferably being used in an amount proportionate to the required measure of precipitation. Usually the lamp black is so oily, due to the presence of greasy material not saponified by alkali, that boiling in a hot alkali solution for some time scarcely suffices to "wet" the black. I have found, however, that if a small quantity of wood alcohol is added to the aqueous alkali the black immediately is wetted and subsequent precipitation of the metallic oxid, hydrate or other compound is rendered uniform or controllable.

Gas black which is prepared by the imperfect combustion of gas, when made from natural gas is quite free from grease and usually substantially free from sulfur. Like lamp black the structure of the particles depends on the conditions of formation, and on the structure depend the physical and chemical properties to some extent. Preferably I use gas black in a flaky form having a more or less feathery but substantially non-porous surface. These feathery or fern like surfaces or structures afford an extended surface for the absorption or occlusion of hydrogen or other gas and when a metallic catalyst is employed in conjunction with the foregoing, the fronds furnish desirable attaching filiae for such metallic material as they enable attachment without interference with the occlusive properties of the hydrogen. Particles of less extended surface usually have irregularities or rugosities thereof which serve as metal supporting members.

When a composite catalyzer of this character is to be prepared I may, for example, employ a plastering treatment, by which term I mean that a metallic oxid or hydrate preferably is freshly precipitated, made into a thick or thin paste and the carbon or other material is plastered with this material using preferably just enough to plaster the tips of the filiae or a portion of the rugosities with the precipitate. The composite may then be dried and acted on by hydrogen or other reducing gas or substance at a temperature sufficient to yield the metal or lower oxids.

The function of the charcoal or gas black in part appears to be as a fount of occluded hydrogen for the metal body when present. Take, for example, some forms of nickel oxid which reduce with comparative difficulty at temperatures below 300° C. and which ordinarily should be reduced at temperatures of 500°–600° C. in the preparation of catalytic material, may be reduced in the presence of gas black at much lower temperatures and with comparative ease. The catalytic sensitiveness of reduced nickel in a measure is dependent on the temperature at which reduction is caused to take place. Other things being equal, it appears that catalytic sensitiveness is favored by reduction at a relatively low temperature of say below 300 or 350° C. As stated, this is more difficult to carry out in the usual manner especially when the nickel compound impregnates inert material which exposes the exterior coating of the nickel oxid but prevents contact of the inner surfaces thereof with the reducing gas and tends to render the operation of reduction imperfect.

In the presence of gas black or similar active material and due no doubt in part at least to the large amount of hydrogen occluded by the active carbonaceous material, precipitated oxid of nickel is reduced with ease even at temperatures below 300° C. and to the degree of reduction desired, giving a very active catalyzer which when reduced at such relatively low temperatures often is observed to have a remarkable pyrophoric character, since on exposure to air it becomes not merely red hot, but strikingly incandescent due no doubt to the great volumes of hydrogen occluded by the active particles. Possibly hydrogen condensed on the gas black surface is liberated when combustion begins and greatly augments the intensity of the combustion phenomena.

So immediate is the response to the reducing action of hydrogen that some compositions consisting of gas black and nickel oxid when placed in a cold reducing apparatus in which a current of cold hydrogen is flowing and heat applied to the exterior of the apparatus, almost immediately generate large volumes of steam long before the apparatus is brought to the usual operating temperature.

Reduction takes place easily and rapidly and when the reduction is complete the product preferably should be removed from the apparatus without exposure to the air as may be done by immersion in oil to seal the pyrophoric product from the oxygen of the air. It should be stated, however, that I do not limit myself to catalyzers of a highly pyrophoric character, but may use any materials effecting a composition within the scope of the present invention whether or not such composition be pyrophoric.

By reducing at higher temperatures, pyrophoric tendencies usually are lessened and although the catalyzer may not be as active as one reduced at a lower temperature, it is on the other hand sometimes less sensitive to catalyzer poisons and may be used under certain circumstances to some advantage.

Mixtures of highly pyrophoric and slightly or non-pyrophoric catalyzers may be used in order to secure the activity of the pyrophoric catalyzer with the somewhat greater ease of handling of the substantially non-pyrophoric catalyzers. Pyrophoric catalyzers may be treated to render them non-pyrophoric if desired.

Catalyzers consisting or comprising a metal oxid with gas black or other form of carbon may be prepared which may be entirely devoid of pyrophoric action.

By partial reduction nickel oxid and metallic nickel in varying proportions may be secured. Similarly with cobalt or other element various oxids or metallic compounds are derived. Platinum and palladium in the metal state or in various colloidal or other active forms and also their salts may be similarly incorporated. Serium and osmium may likewise be mingled with the extender to form a duplex catalyzer. Nickel oxalates may be ignited to produce nickel oxid in a very voluminous form and this light oxid may be mixed with charcoal or gas black in the proportion of about 1 to 3 to produce a catalyzer mixture.

Instead of using the plastering treatment mentioned above I may form merely a thin or substantially superficial layer of the metallic material or its compounds by simply dipping carbon or other material in a strong solution of a suitable metallic salt, removing quickly and immediately drying, thus incrusting the surface or superficial portion of the mass with the metallic salt. Nickel may be applied using such salts as nickel sulfate, acetate and the like. A catalyzer may be obtained by dissolving a nickel salt or compound such as the hydroxid in ammonia and treating carbon or other material with this solution. On slight heating the ammonia is expelled and the nickel compound is lodged on the material. This material may then be reduced in a current of hydrogen preferably at a relatively low temperature. Nickel nitrate, which likewise may be used with mineral material for preparing the catalyzer body, is not as suitable a salt to use with charcoal, owing to the possible oxidizing action of the combined nitric acid on the charcoal. Nickel nitrate and ammonia, however, especially with infusorial earth, pumice, fullers' earth, asbestos and other finely-divided mineral material may be advantageously employed. Another manner of preparing the catalyzer is to precipitate a soluble nickel salt with carbonate of soda or some other precipitant, subsequently collecting the precipitate, adding preferably a little sugar, dextrin and the like and incorporating finely-divided carbon or other material with the damp precipitate, thus coating the surface of the charcoal, etc., with the insoluble nickel salt. The composition may then be dried and heated and the nickel reduced by hydrogen.

Nickel hydrate may be dissolved in ammonia especially, as is well known, in the presence of an ammonia salt. A quantity of sugar may be dissolved in this solution (or as sugar facilitates the solution of nickel hydrate, the former may be initially present) the solution evaporated to dryness and carefully heated to cause swelling and carbonization, the heat being applied to afford preferably the maximum amount of intumescence and expansion. The vesiculated mass which thus may be produced may be used directly as a catalyzer, or it may first be reduced in hydrogen.

To recapitulate, my invention relates to a catalyzer adapted for hydrogenating oils, comprising preferably a substantially non-porous body and metallic or metalliferous material such as nickel or nickel oxid substantially only externally attached thereto, and to the process of making a catalytic body which comprises incorporating a metal compound, water, ammonia and extending material such as charcoal, gas black, pumice, infusorial earth and the like, heating to eliminate volatile matter and reducing in an atmosphere of hydrogen or hydrogen-containing gas; whereby reduced metal attached to said extending material is formed.

What I claim is:

1. A catalyzer adapted for hydrogenating oils comprising a substantially pulverulent non-porous body and nickel material attached substantially only externally thereto.

2. A catalyzer adapted for hydrogenating oils comprising a substantially pulverulent non-porous body and metallic nickel attached substantially only externally thereto.

3. A catalyzer adapted for hydrogenating oils comprising a substantially pulverulent non-porous body and metalliferous catalytic-material attached substantially only externally thereto.

4. A catalyzer adapted for hydrogenating oils comprising a substantially pulverulent active non-porous body and metalliferous catalytic-material attached substantially only externally thereto.

5. A catalyzer adapted for hydrogenating oils comprising a substantially pulverulent active carbonaceous non-porous body and metalliferous catalytic material attached substantially only externally thereto.

6. The process of making a catalyzer which comprises incorporating a nickel compound, water, ammonia, and extending material, heating to eliminate volatile matter and reducing in a current of hydrogen or hydrogen-containing gas.

7. The process of making a catalyzer which comprises incorporating a nickel compound, water, ammonia, and extending material, heating to eliminate volatile matter and reducing in hydrogen or hydrogen-containing gas; whereby reduced nickel attached to said extending material is formed.

8. The process of making a catalyzer which comprises incorporating metal compound, water, ammonia, and extending material, heating to eliminate volatile matter and reducing in hydrogen or hydrogen-containing gas; whereby reduced metal attached to said extending material is formed.

9. The process of making a catalyzer which comprises incorporating a metal compound, a solvent therefor, ammonia and pulverulent active carbonaceous material, heating to eliminate volatile material and reducing in hydrogen or hydrogen-containing gas.

Signed at New York, in the county of New York and State of New York this 5th day of August, A. D. 1913.

CARLETON ELLIS.

Witnesses:
WM. B. CRAGIN,
GILBERT TOMPKINS.